United States Patent
Costello et al.

(10) Patent No.: US 10,401,216 B2
(45) Date of Patent: Sep. 3, 2019

(54) COMBINATION LENS INCLUDING AN AMBIENT LIGHT SENSOR PORTION AND A PROXIMITY SENSOR PORTION FOR PROXIMITY SENSING AND AMBIENT LIGHT SENSING

(71) Applicant: AVAGO TECHNOLOGIES INTERNATIONAL SALES PTE. LIMITED, Singapore (SG)

(72) Inventors: James Costello, Singapore (SG); Gek Yong Ng, Singapore (SG); Siong Lee Loh, Singapore (SG); Cherng Woei Heng, Sembilan (MY)

(73) Assignee: Avago Technologies International Sales Pte. Limited, Singapore (SG)

( * ) Notice: Subject to any disclaimer, the term of this patent is extended or adjusted under 35 U.S.C. 154(b) by 324 days.

(21) Appl. No.: 14/927,992

(22) Filed: Oct. 30, 2015

(65) Prior Publication Data

US 2017/0122800 A1 May 4, 2017

(51) Int. Cl.
| | |
|---|---|
| *G01J 1/04* | (2006.01) |
| *G01S 7/481* | (2006.01) |
| *G01S 17/02* | (2006.01) |
| *G01J 1/42* | (2006.01) |
| *G02B 3/10* | (2006.01) |
| *G02B 5/02* | (2006.01) |
| *G01D 5/347* | (2006.01) |

(52) U.S. Cl.
CPC ........... *G01J 1/0474* (2013.01); *G01J 1/0407* (2013.01); *G01J 1/0411* (2013.01); *G01J 1/4204* (2013.01); *G01J 1/4228* (2013.01); *G01S 7/4816* (2013.01); *G01S 17/026* (2013.01); *G02B 3/10* (2013.01); *G02B 5/0294* (2013.01); *G01D 5/34715* (2013.01)

(58) Field of Classification Search
CPC .......... G01J 1/0474; G01J 1/42; G01J 1/4204; G01J 1/4228; G01J 1/0407; G01J 1/0411; G01D 5/34; G01D 5/34715; G02B 5/0294; G02B 3/10; G06F 1/1656; G06F 1/1684; H01L 27/14625; H01L 27/14618; H03K 17/941; H03K 17/945; H04B 1/587; G01S 7/4816; G01S 17/026
See application file for complete search history.

(56) References Cited

U.S. PATENT DOCUMENTS

| | | | |
|---|---|---|---|
| 8,461,530 B2 | 6/2013 | Findlay et al. | |
| 9,006,636 B2 | 4/2015 | Findlay | |
| 2004/0004723 A1* | 1/2004 | Seko | G01B 9/02 356/498 |
| 2008/0239088 A1* | 10/2008 | Yamashita | G02B 27/0075 348/222.1 |

(Continued)

*Primary Examiner* — Que Tan Le
*Assistant Examiner* — Jennifer D Bennett
(74) *Attorney, Agent, or Firm* — Sheridan Ross P.C.

(57) ABSTRACT

A sensor, optical system, and combination lens for use with an optical sensor are disclosed. An illustrative optical system is described to include a photodetector having a proximity sensor area and an ambient light sensor area that is physically separated from the proximity sensor area as well as a combination lens that includes a proximity sensor focusing portion and an ambient light sensor focusing portion that each separately direct incident light for the proximity sensor area and the ambient light sensor area, respectively.

20 Claims, 7 Drawing Sheets

(56) References Cited

U.S. PATENT DOCUMENTS

| | | | | |
|---|---|---|---|---|
| 2010/0194288 A1* | 8/2010 | Norgaard | G01J 1/32 | |
| | | | 315/149 | |
| 2010/0214468 A1* | 8/2010 | Caron | G02B 3/10 | |
| | | | 348/345 | |
| 2011/0133941 A1* | 6/2011 | Yao | G01J 1/02 | |
| | | | 340/600 | |
| 2012/0132806 A1* | 5/2012 | Findlay | G01J 1/0266 | |
| | | | 250/338.1 | |
| 2012/0133799 A1* | 5/2012 | Findlay | G01S 7/4816 | |
| | | | 348/241 | |
| 2014/0252209 A1* | 9/2014 | Land | G01S 17/026 | |
| | | | 250/208.2 | |
| 2017/0038459 A1* | 2/2017 | Kubacki | G01S 17/36 | |

* cited by examiner

COMBINATION LENS INCLUDING AN AMBIENT LIGHT SENSOR PORTION AND A PROXIMITY SENSOR PORTION FOR PROXIMITY SENSING AND AMBIENT LIGHT SENSING

FIELD OF THE DISCLOSURE

The present disclosure is generally directed toward sensing devices and, in particular, toward optical sensing devices.

BACKGROUND

There are many different types of sensors on the market, with each having specific capabilities, uses, and shortcomings. Two types of sensors that utilize optical components for sensing purposes are ambient light sensors and proximity sensors.

Ambient light sensors normally use a relatively small number of photosensitive pixels. In other words, the photosensitive area of an ambient light sensor is usually relatively small. Ambient light sensors are used in a number of applications such as mobile communication devices, laptops, Personal Digital Assistants, web cameras, imaging, photography, etc.

Proximity sensors, as compared to ambient light sensors, typically a light source and a corresponding photodetector. The photodetector of a proximity sensor, not unlike the ambient light sensor, includes a number of photosensitive pixels. Proximity sensing (e.g., detecting a presence or proximity of an object near the sensor) involves transmitting light via the light source and then receiving light that reflects off an object-to-be-detected at the photodetector. The types of applications in which proximity sensors are used include mobile communication devices, industrial equipment, manufacturing equipment, etc.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

With reference now to FIGS. 1-7, an optical system 100 and various configurations of a an optical sensor that can be used within such an optical system 100 will be described in accordance with at least some embodiments of the present disclosure. It should be appreciated that any aspect of any optical sensor configuration can be used in combination with or in lieu of any other aspect of other optical sensor configurations described herein. For instance, aspects of the optical sensor configuration depicted in FIGS. 3 and 4 may be utilized in combination with or in lieu of aspects of the optical sensor configuration depicted in FIGS. 5 and 6.

Figure 1:
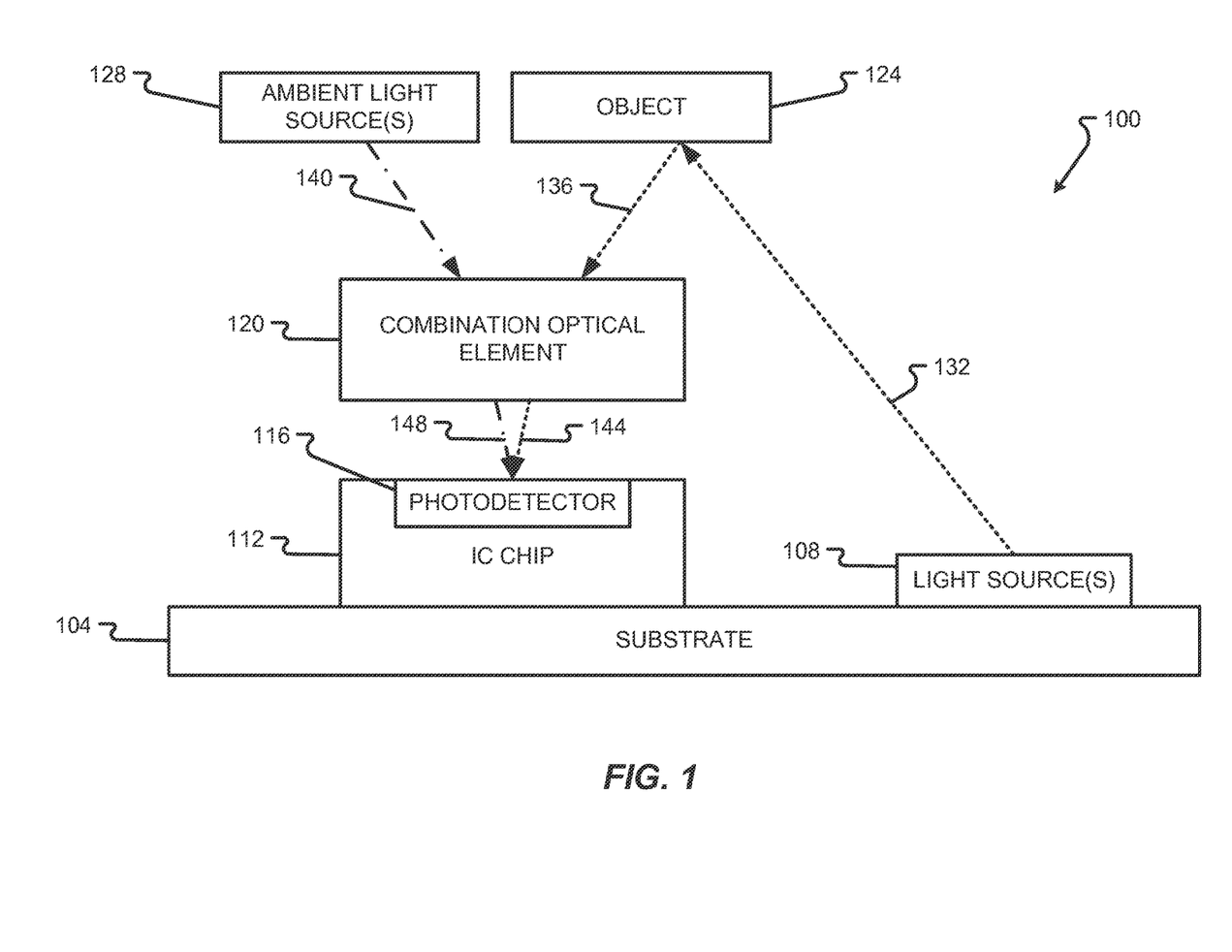
FIG. 1 depicts a block diagram of an optical system in accordance with embodiments of the present disclosure.

Referring initially to FIG. 1, details of the optical system 100 will be described in accordance with at least some embodiments of the present disclosure. The optical system 100 is shown to include a substrate 104 on which an Integrated Circuit (IC) chip and one or more light source 108 are mounted. It should be appreciated that the substrate 104 may be divided into multiple substrates and each portion of the substrate 104 may support different components. Although not depicted, the substrate 104 may also physically support or be directly connected to a combination optical element 120 that is used to direct/disperse/focus light for a photodetector 116 provided on the IC chip 112. For example, material of the combination optical element 120 may be deposited directly on the top surface of the substrate 104 and then formed to have the appropriate features as will be discussed in further detail herein. In other examples, the combination optical element 120 may cover the entire surface of the substrate or just a portion thereof (e.g., be formed just over the photodetector 116). In some embodiments, the combination optical element 120 may be formed on the top surface of the IC chip 112 rather than being formed on the substrate 104. As a non-limiting example, the combination optical element 120 may be deposited, molded, or otherwise formed directly onto the substrate 104 and/or IC chip 112. In other embodiments, the combination optical element 120 may be a separate piece part that is connected by adhesive or mechanical mechanisms (e.g., snap fittings, clasps, friction fittings, etc.) to the IC chip 112 and/or substrate 104.

The substrate 104 may include any type of object or collection of objects capable of physically supporting the light source(s) 108 and/or IC chip 112. The substrate 104 may also include elements that enable current to pass between objects mounted thereto. As an example, the substrate 104 may include a Printed Circuit Board (PCB) or the like and the IC chip 112 and light sources 108 may be mounted to the substrate 104. Examples of technologies that may be used to connect the light source(s) 108 and/or IC chip 112 to the substrate 104 include, without limitation, thru-hole mounting technologies, surface mount technologies, flip-chip mounting technologies, or the like.

The light source(s) 108 may correspond to a single light source or a plurality of light sources. The light source(s) 108 may be configured to emit radiation of a predetermined wavelength either continuously, periodically, and/or intermittently. A driver for the light source(s) 108 (not depicted) may be used to provide a driving current to the light source(s) 108, which causes the light source(s) 108 to produced emitted light 132. The driver may employ logic to have the light source(s) 108 only emit light during a certain period of time during which proximity detection is being performed by the IC chip 112. When proximity detection is not being performed (e.g., if ambient light detection is being performed instead or if no detection is currently being performed to save battery life), the driver for the light source(s) 108 may not transmit a drive signal to the light source(s) 108, thereby resulting in no production of the emitted light 132. Examples of suitable light source(s) 108 include, without limitation, a Light Emitting Diode (LED), a collection of LEDs, a laser diode, a collection of laser diodes, or any other solid-state light-emitting device. As a non-limiting example, if multiple light sources 108 are used, then two or more of the different light sources 108 may be configured to emit light of the same characteristics (e.g., color, wavelength, frequency, etc.) or light of different characteristics.

The IC chip 112 may include any type of known digital processing components (e.g., transistors, logic gates, latches, etc.). In some embodiments, the IC chip 112 may include its components in a silicon format. The photodetector 116 may correspond to an optically sensitive set of pixels established on or in the IC chip 112 in an array or the like. For example, the photodetector 116 may correspond to an array of photo-sensitive pixels established across the exposed surface of the IC chip 112 (e.g., the surface facing away from the substrate 104). The photodetector 116 may be configured to convert incident light 144, 148 into electrical signals that are transferred to other components of the IC chip 112, processed, and eventually results in the IC chip 112 producing an output via one or more of its leads that are connected to the substrate. As will be discussed in further detail herein, the photodetector 116 may be divided into two distinct portions, where one area of the photodetector 116 is responsible for receiving and converting first incident light 144 into first electrical signals used for a first purpose (e.g., proximity detection) and where another area of the photodetector 116 is responsible for receiving and converting second incident light 148 into second electrical signals used for a second purpose (e.g., ambient light sensing).

In some embodiments, the first incident light 144 received at the photodetector 116 may result in the creation of a first electrical signal that is provided to a first set of processing components in the IC chip 112. On the other hand, the second incident light 148 received at the photodetector 116 may result in the creation of a second electrical signal that is provided to a second set of processing components in the IC chip 112 that are different from the first set of processing components that receive the first electrical signal. In this way, the space of the IC chip 112 can be multi-functional and capable of processing signals produced by the photodetector 116, regardless of whether the signals are being used for proximity detection purposes or ambient light sensing purposes. Furthermore, the outputs of such processing may be produced by the IC chip 112 on a common output lead or on different output leads. Where different output leads are utilized to output the different output signals (e.g., proximity detection output signal and ambient light sensing output signal), then different traces on the substrate 104 may be used to carry the different output signals. Where the same output lead of the IC chip 112 is used to output the different signals (e.g., on a time-varying basis), then the same trace on the substrate 104 may be used to carry both output signals, but at different times.

The combination optical element 120, as will be discussed in further detail herein, may be substantially transparent or semi-transparent to light emitted by the light source(s) 108 as well as environment light 140 emitted by ambient light source(s) 128. In some embodiments, the emitted light 132 produced by the light source(s) 108 may correspond to infrared light or light of some other wavelength not visible to the naked human eye. The environmental light 140, on the other hand, may correspond to visible light, infrared light, ultraviolet light, or light of some other wavelength that is or is not visible to the naked human eye. The ambient light source(s) 128 may correspond to any number of elements that produce environmental light 140. Examples of ambient light source(s) 128 include, without limitation, the sun, light bulbs, display screens, televisions, projectors, and anything else capable of producing light.

As shown in FIG. 1, emitted light 132 produced by the light source(s) 108 may be directed away from the substrate 104 such that it impacts an object 124 within proximity of the light source(s) 108. The object 124 may reflect some or all of the emitted light 132 as reflected light 136. The reflected light 136 may be of the same or similar wavelength as the emitted light 132. Examples of the object 124 include, without limitation, a finger, stylus, person's body part, animal, manufactured component, or the like. Indeed, any item or collection of items capable of partially or completely reflecting the emitted light 132 may be considered an object 124.

The combination optical element 120 receives both the environmental light 140 and reflected light 136 and directs/disperses/focuses the light toward the photodetector 116. The light output by the combination optical element 120 for the photodetector 116 may correspond to first incident light 144 and second incident light 148. The first incident light 144 may be the same or similar wavelength as the reflected light 136 whereas the second incident light 148 may be the same or similar wavelength as the environmental light 140. Both incident lights 144, 148 may impact the photodetector 116 and result in the photodetector 116 producing an electrical signal or output within the IC chip 112.

The combination optical element 120 may be constructed of any polymer or combination of polymers using extrusion, machining, micro-machining, molding, injection molding, or a combination of such manufacturing techniques. More specifically, the combination optical element 120 may be constructed of any transparent or translucent material to both lights 136, 140. Examples of materials that can be used for the combination optical element 120 include, without limitation, epoxy, silicone, a hybrid of silicone and epoxy, phosphor, a hybrid of phosphor and silicone, an amorphous polyamide resin or fluorocarbon, glass, plastic, or combinations thereof. In some embodiments, the combination optical element 120 may comprise at least one of a solid material, half-solid material, and gel-type encapsulation that substantially encapsulates the IC chip 112 or at least the photodetector 116 on the IC chip 112.

Figure 2:
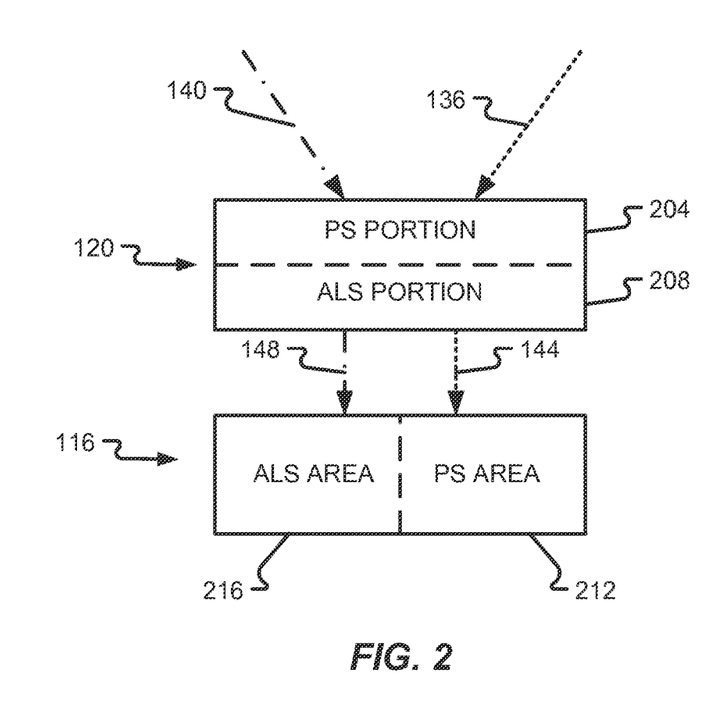
FIG. 2 is a block diagram depicting details of an optical element and photodetector in accordance with at least some embodiments of the present disclosure.

With reference now to FIG. 2, additional details of the combination optical element 120 (or "optical element" for ease of discussion) and photodetector 116 will be described in accordance with at least some embodiments of the present disclosure. The optical element 120 is shown to include a photosensing portion (PS portion) 204 and an ambient light sensing (ALS) portion 208. The photodetector 116 is shown to include a PS area 212 and an ALS area 216. The PS area 212 may be configured to receive the first incident light 144, which corresponds to reflected light 136 having traveled through the PS portion 204 of the optical element 120. On the other hand, the ALS area 216 may be configured to receive the second incident light 148, which corresponds to environmental light 140 having traveled through the ALS portion 208.

In some embodiments, the PS portion 204 and ALS portion 208 may be integral to a common piece of material.

A boundary between the PS portion 204 and ALS portion 208 may be discrete (e.g., correspond to a line) or non-discrete (e.g., be a smooth transition). In some embodiments, the PS portion 204 is configured to focus incident light thereon for the PS area 212 while the ALS portion 208 simultaneously diffuses the incident light for the ALS area 216. Said another way, optical element 120 may utilize the PS portion 204 and the ALS portion 208 to separately direct incident light 144, 148 for the PS area 212 and ALS area 216, respectively.

Figure 3:
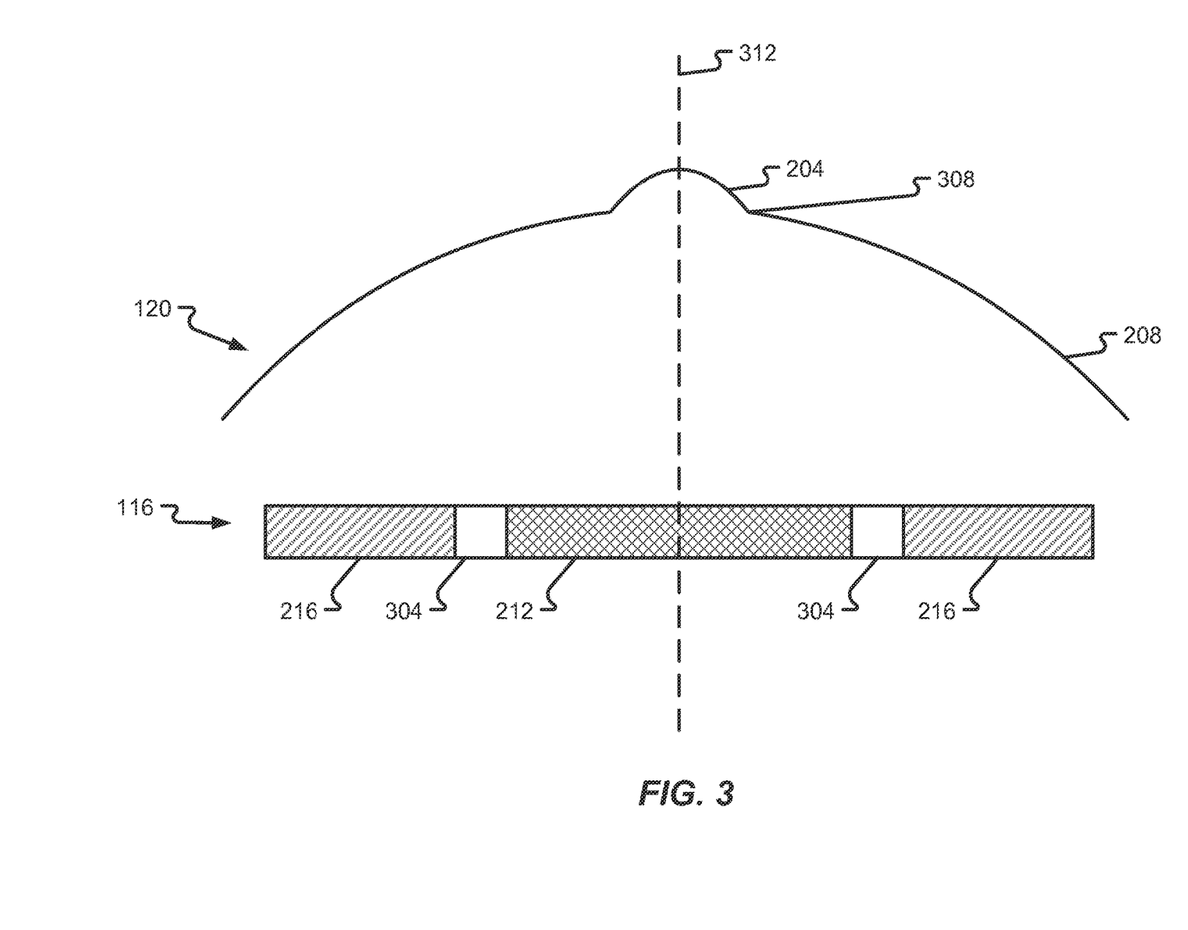
FIG. 3 is a cross-sectional side view of an optical sensor having a first configuration in accordance with at least some embodiments of the present disclosure.
Figure 4:
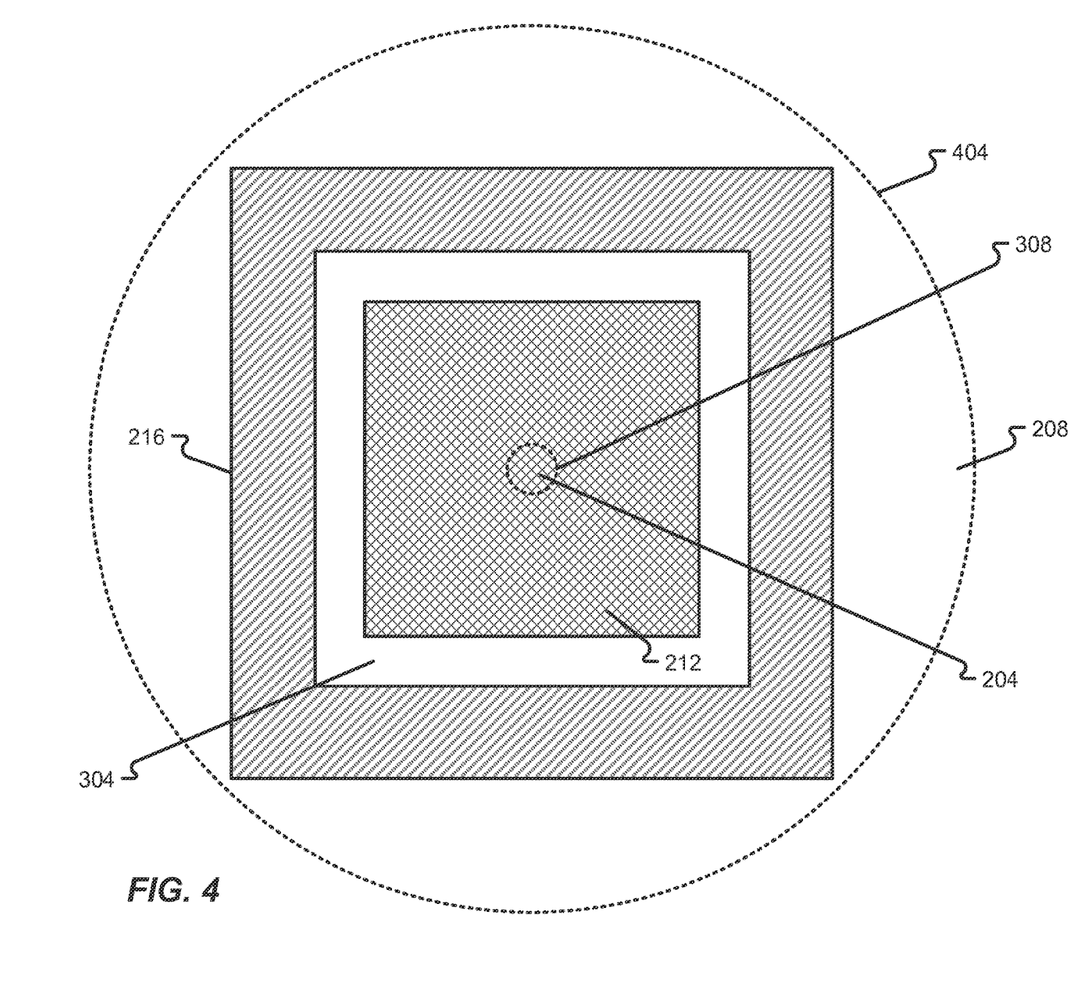
FIG. 4 is a top view of the optical sensor shown in FIG. 3.

With reference now to FIGS. 3-7, various possible configurations of an optical element 120 and photodetector 116 will be described in accordance with at least some embodiments of the present disclosure. FIGS. 3 and 4 depict a first illustrative, but non-limiting, configuration where the optical element 120 includes the PS portion 204 situated directly atop the ALS portion 208. Both the PS portion 208 and ALS portion 208 are shown to be configured with a radius of curvature and may be configured in a dome or cylindrical shape without departing from the scope of the present disclosure. The PS portion 204 is shown to have a smaller radius of curvature than the ALS portion 208. The PS portion 204 also shown to be centered with respect to a center line 312 on the ALS portion 208. The center line 312 may correspond to a center or substantial center of the photodetector 116, which may coincide with a center of the PS area on the photodetector 116. In some embodiments, the PS portion 204 focuses reflected light 136 to produce first incident light 144 for the PS area 212—thereby creating as strong a signal (as measured by amplitude) as possible at the PS area 212. In some embodiments, the PS portion 204 may be configured to focus the reflected light 136 such that little or no first incident light 144 impacts the ALS area 216. The ALS portion 208, on the other hand, diffuses or disperses the environmental light 140 as second incident light 148 for the ALS area 216. Contrary to the PS portion 204, the ALS portion 208 may function to diffuse or disperse the second incident light 148 across all of the photodetector 116 (including the PS area 212). The purpose and configuration of the ALS portion 208, in some embodiments, is to try and evenly or substantially evenly distribute environmental light 140 across as much of the photodetector 116 as possible—thereby providing a substantially even signal across all pixels of the ALS area 216.

The configuration shown in FIGS. 3 and 4 also show that the center (or center of mass) of the optical element 120 is substantially aligned with the center axis 312, which is also aligned with the center (or center of mass) of the photodetector 116. As seen in FIG. 4, the center of the photodetector 116 may correspond to a center of mass for both the PS area 212 and the ALS area 216.

This particular configuration also exhibits a separation element 304 between the PS area 212 area and the ALS area 216. In some embodiments, the separation element 304 may correspond to a portion of the silicon photodetector that is devoid of photosensitive pixels. In other embodiments, the separation element 304 may correspond to inactive photosensitive pixels (e.g., pixels that were produced, but are not connected to any underlying circuitry). In some embodiments, the position and dimensions (e.g., width) of the separation element 304 may be designed to lie outside a focal area of the PS portion 204 of the optical element 120 so that light being focused by the PS portion 204 does not extend beyond the separation element 304 to the ALS area 216. Although the illustrative configuration of FIG. 4 shows the PS area 212 to be square and surrounded by the separation element 304 and ALS area 216, it should be appreciated that embodiments of the present disclosure are not so limited. For instance, the PS area 212 may exhibit a circular, rectangular, oval, trapezoidal, or other non-symmetrical shape. The separation element 304 may be uniform in its width or it may have a varying width in the x-dimension and y-dimension (e.g., may be skinnier or wider in one dimension as compared to another).

FIG. 4 also shows the lens boundary 404 extending beyond the outer perimeter of the ALS area 216. As mentioned before, the optical element 120 may be larger than the photodetector 116 and even larger than the IC chip 112 on which the photodetector 116 is provided. In other embodiments, the optical element 120 and its lens boundary 404 may be smaller than the IC chip 112 or possibly smaller than the outer perimeter of the photodetector 116. If the optical element 120 is designed to have its lens boundary 404 not entirely encompass the photodetector 116, then the ALS portion 208 may be designed/curved so as to appropriately disperse light onto as much of the ALS area 216 as possible.

In some embodiments, the PS area 212 and ALS area 216 may have approximately the same number of pixels or take up approximately the same area on the photodetector 116. In some embodiments, the PS area 212 may be smaller (as measured by area or pixel count) than the ALS area 216. In some embodiments, the ALS area 216 may be smaller than the PS area 212. In some embodiments, the area consumed by the separation element 304 may be approximately half the area consumed the ALS area 216.

Figure 5:
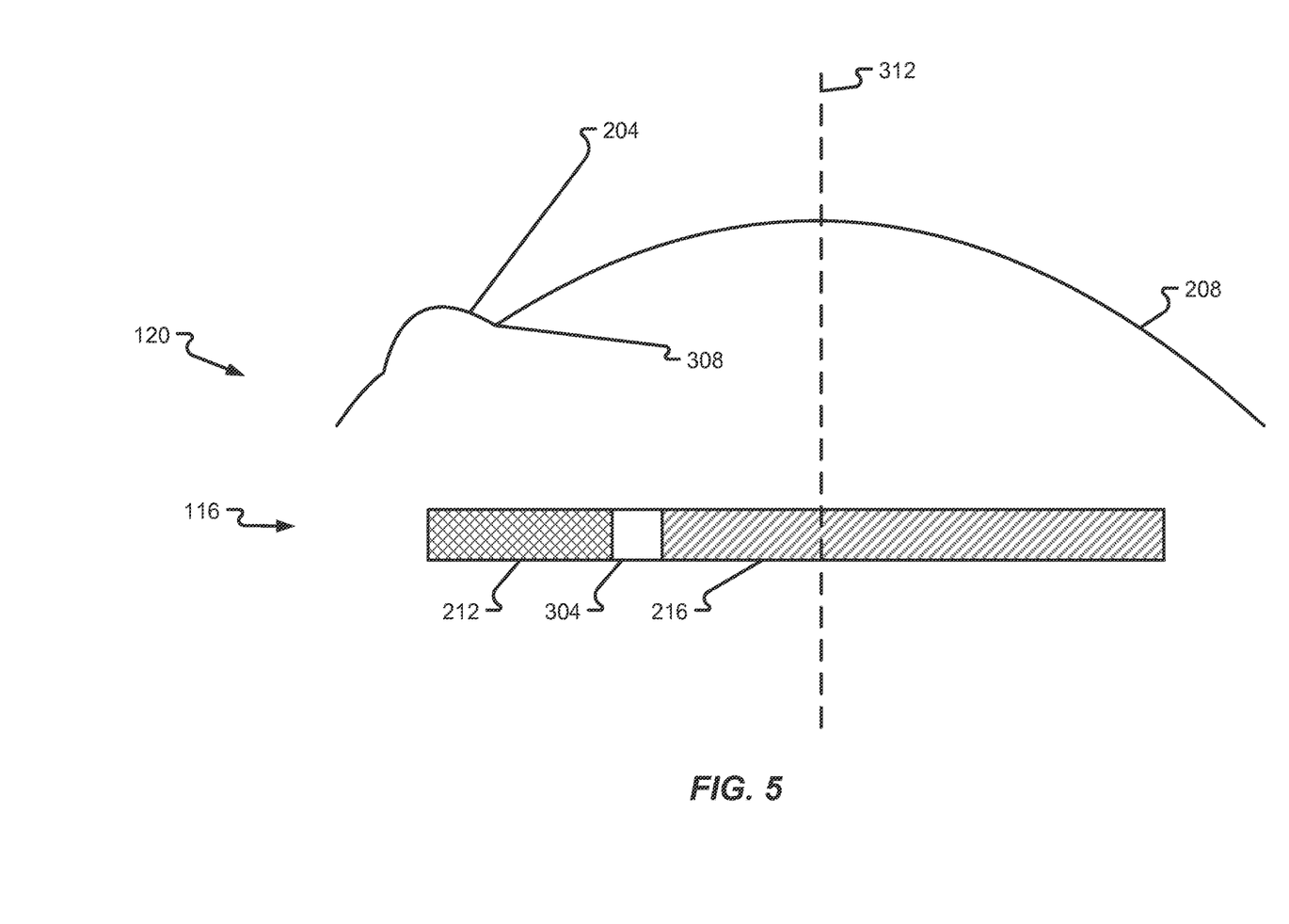
FIG. 5 is a cross-sectional side view of an optical sensor having a second configuration in accordance with at least some embodiments of the present disclosure.
Figure 6:
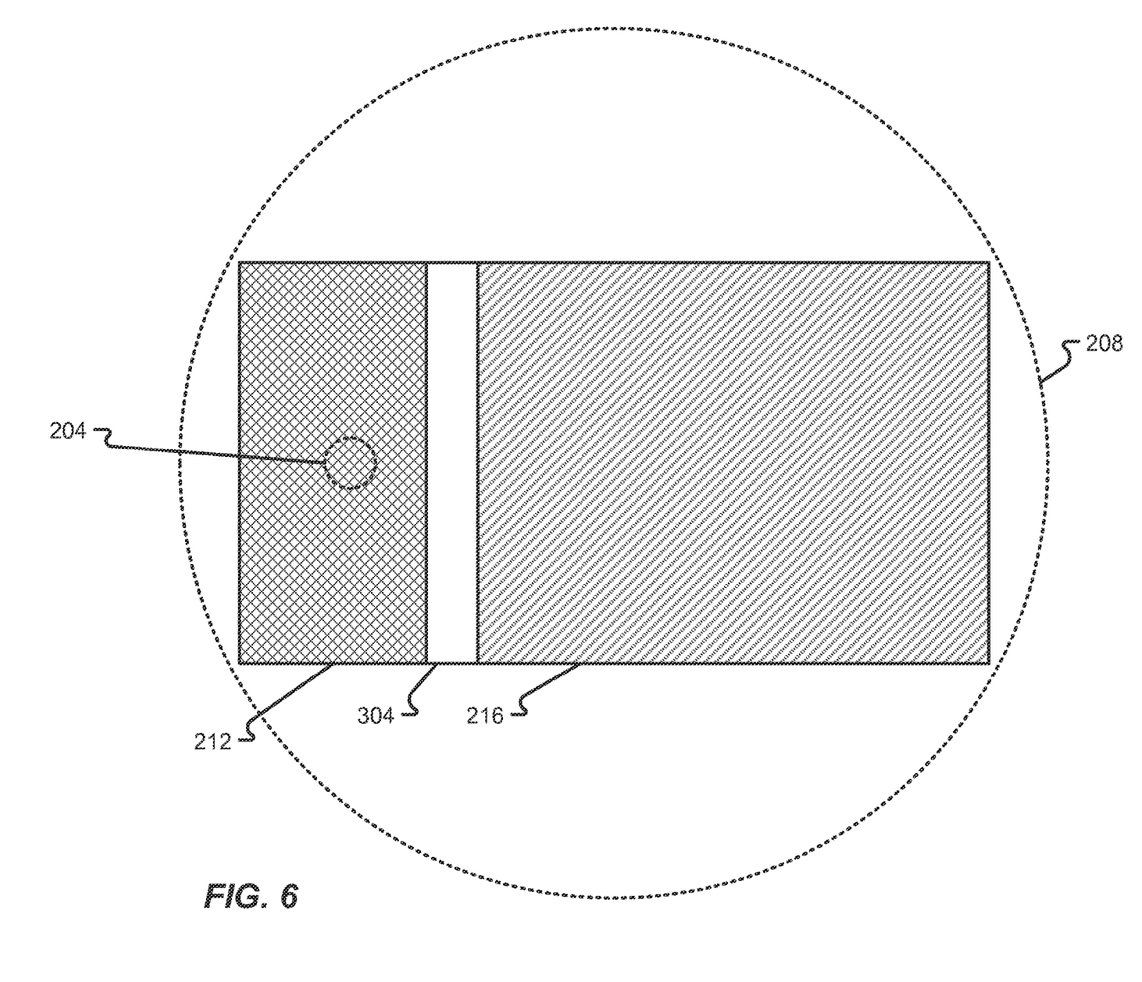
FIG. 6 is a top view of the optical sensor shown in FIG. 5.

With reference now to FIGS. 5 and 6, a second possible configuration of a sensor will be described in accordance with at least some embodiments of the present disclosure. This second configuration shows a solution whereby the photodetector 116 has the ALS area 216 not surrounding the PS area 212. In particular, the ALS area 216 is shown to be located on one extreme of the photodetector 116 whereas the PS area 212 is located on the other side of the photodetector 116. Again, the separation element 304 is shown to be provided between the areas 212, 216. It should be appreciated that the separation element 304 may be an optional element in this or any other configuration of the photodetector described herein.

In some embodiments, the PS area 212 may be positioned on a side of the photodetector 116 that is furthest away from the light source(s) 108, thereby making it easier to focus the first incident light 144 onto the PS area 212 without having the first incident light 144 impact the ALS area 216. In this configuration, similar to the configuration of FIGS. 3 and 4, the lens boundary may extend beyond the perimeter of the photodetector 116. One difference in this configuration, however, is that the PS portion 204 is offset from the center axis 312 of the photodetector 116 and is offset from the center or top of the optical element 120. In particular, the PS portion 204 is biased toward the side of the photodetector 116 where the PS area 212 is located. This may mean that the PS portion 204 is biased closer to the light source(s) 108 to help focus the first incident light 144 onto the PS area 212.

In some embodiments, the separation element 304 may correspond to a band or strip in the photodetector 116 that physically separates the ALS area 216 from the PS area 212. The separation element 304 may have a width or thickness that separates the PS area 212 from the ALS area 216 a sufficient amount to ensure that the first incident light 144 does not impact much or any of the PS area 212.

The ALS portion 208 of the optical element 120 is still used to disperse/diffuse the environmental light 140 into second incident light 148. In some embodiments, the design of the ALS portion 208 may cause the environmental light 140 to be substantially evenly distributed across most or all of the photodetector 116, but at least most or all of the ALS area 216. In some embodiments, the ALS portion 208 may include inclusions, phosphor, sediment, or other elements that help to disperse the environmental light 140. However, since the PS portion 204 and ALS portion 208 may be constructed from the same material (and possibly be integral with one another), it may not be desirable to provide the light-diffusing materials into the optical element 120 so that the PS portion 204 is still able to adequately focus the reflected light 136 into first incident light 144.

FIG. 6 more clearly shows a situation where the size/area of the PS area 212 is less than the size/area of the ALS area 216. As a non-limiting example, the PS area 212 may consume less than half the total area of the photodetector consumed by the ALS area 216. In some embodiments, the shape of the ALS area 216 can be different from the shape of the PS area 212. For instance, the ALS area 216 may be square whereas the PS area 212 may be rectangular—or vice versa.

Figure 7:
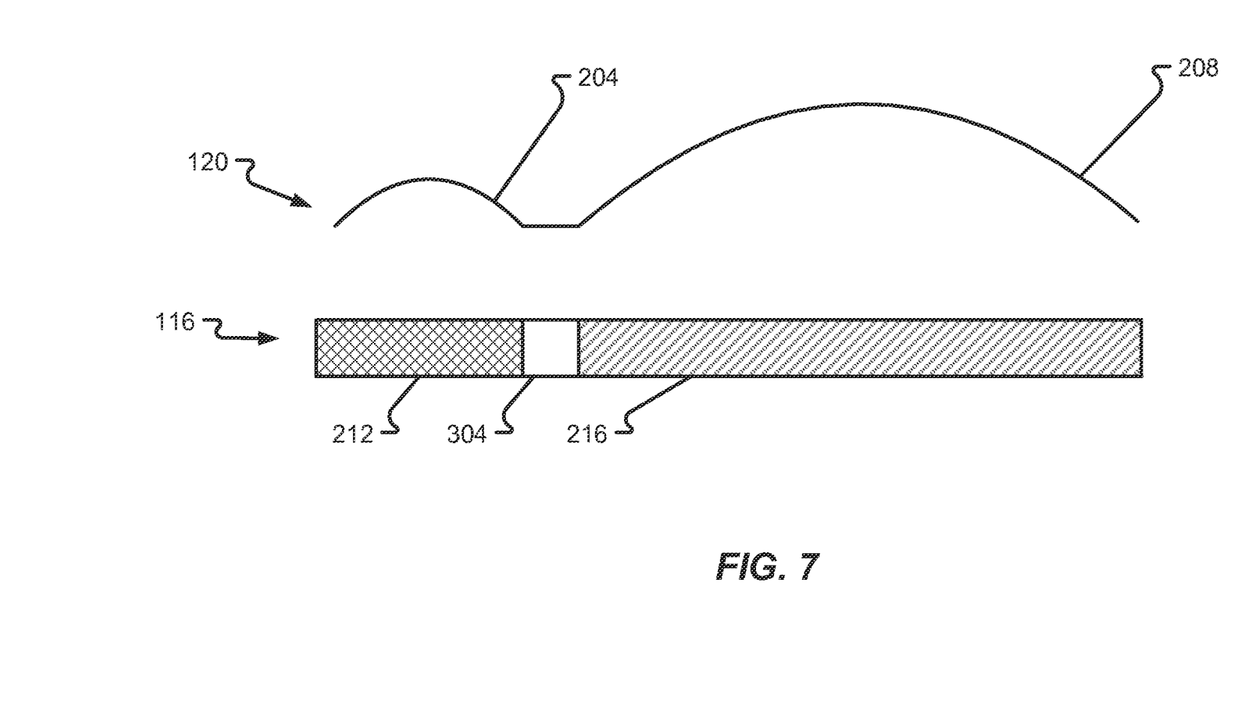
FIG. 7 is a cross-sectional side view of an optical sensor having a third configuration in accordance with at least some embodiments of the present disclosure.

FIG. 7 depicts a variation of the configuration depicted in FIGS. 5 and 6 and will be described in accordance with at least some embodiments. The configuration of FIG. 7 shows a combination optical element 120 where the PS portion 204 is not provided directly on the ALS portion 208. More specifically, the PS portion 204 and ALS portion 208 may still be constructed of a common material and may be formed during the same manufacturing step (e.g., during a molding step), but there is not a discrete lens transition 308 between the portions 204, 208. Instead, a larger transition (e.g., larger than a line) is provided between the PS portion 204 and the ALS portion 208. Here also, the size of the ALS portion 208 is less than the entire size of the photodetector 116. In this particular configuration, the optical element 120 may be formed over the entire photodetector 116 (or the entire IC chip 112), but the PS portion 204 only overlies the PS area 212 (e.g., does not overly the ALS area 216). Similarly, the ALS portion 208 is shown to only overly the ALS area 216 and not the PS area 212. In this particular configuration, it may be possible to provide additional inclusions or diffusing elements in the ALS portion 208 without including those inclusions or elements in the PS portion 204. The optical element 120 may behave in a similar way to the other configurations of the optical element 120 described herein. Namely, the PS portion 204 may be used to focus the reflected light 136 as first incident light 144 onto the PS area while the ALS portion 208 may be used to disperse/diffuse the environmental light 140 onto at least the ALS area 216 and potentially the entirety or majority of the photodetector. Furthermore, the PS area 212 and PS portion 204 may be biased toward or closer to the light source(s) 108 as compared to the ALS area 216 and ALS portion 208, respectively.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A sensor, comprising:
a proximity sensor element;
an ambient light sensor element that is physically separated from the proximity sensor element; and
a combination lens provided over the proximity sensor element and ambient light sensor element, wherein the combination lens is configured to focus incident light thereon for the proximity sensor element while simultaneously diffusing the incident light for the ambient light sensor element, wherein the combination lens includes an ambient light sensor focusing portion and a proximity sensor focusing portion, wherein the proximity sensor focusing portion corresponds to a bump established on the ambient light sensor focusing portion such that, in a cross sectional view, i) a first curved portion of the ambient light sensor focusing portion transitions into the bump, and ii) a second curved portion of the ambient light sensor focusing portion transitions into the bump, and wherein, in the cross sectional view, the first and second curved portions are on opposite sides of the bump.

2. The sensor of claim 1, wherein the proximity sensor element comprises a plurality of proximity light sensing pixels that are completely surrounded by a plurality of ambient light sensing pixels that represent the ambient light sensor element.

3. The sensor of claim 2, wherein the proximity sensor element and the ambient light sensor element both correspond to optically-responsive areas of a photodetector array.

4. The sensor of claim 3, wherein the photodetector array is included in a single Integrated Circuit (IC) chip.

5. The sensor of claim 2, wherein a center of mass of the proximity sensor element is collocated with a center of mass of the ambient light sensor element.

6. The sensor of claim 1, wherein the combination lens comprises two discrete focusing radii.

7. The sensor of claim 6, wherein the proximity sensor element is enclosed by the ambient light sensor element.

8. The sensor of claim 1, wherein the proximity sensor focusing portion is located at a center of the ambient light sensor focusing portion.

9. The sensor of claim 8, wherein ends of the first and second curved portions extend beyond outer perimeters of the proximity sensor element and the ambient light sensor element.

10. The sensor of claim 6, wherein the proximity sensor focusing portion and the ambient light sensor focusing portion are integrally formed together from a common material.

11. An optical system, comprising:
a photodetector comprising a proximity sensor area and an ambient light sensor area that is physically separated from the proximity sensor area; and
a combination lens that includes a proximity sensor focusing portion and an ambient light sensor focusing portion that each separately direct incident light for the proximity sensor area and the ambient light sensor area, respectively, wherein the proximity sensor focusing portion corresponds to a bump established on and located at a center of the ambient light sensor focusing portion, wherein the proximity sensor focusing portion of the combination lens focuses the incident light on the proximity sensor area of the photodetector, and wherein the ambient light sensor focusing portion of the combination lens diffuses the incident light on the ambient light sensor area of the photodetector.

12. The optical system of claim 11, wherein the proximity sensor area is centered within the ambient light sensor area.

13. The optical system of claim 12, wherein the proximity sensor focusing portion and the ambient light sensor focusing portion are integrally formed together from a common material.

14. The optical system of claim 11, wherein the proximity sensor area comprises a plurality of proximity light sensing pixels, wherein the ambient light sensor area comprises a plurality of ambient light sensing pixels, and wherein the plurality of ambient light sensing pixels completely surround the plurality of proximity light sensing pixels.

15. The optical system of claim 14, wherein the proximity sensor area is centered within the ambient light sensor area.

16. The optical system of claim 11, wherein the proximity sensor area is completely surrounded by the ambient light sensor area.

17. The optical system of claim 11, wherein the proximity sensor focusing portion and the ambient light sensor focusing portion are integrally formed together from a common material.

18. A combination lens for use with an optical sensor including both a proximity sensor and an ambient light sensor, the combination lens comprising:

a proximity sensor focusing portion that focuses incident light on the combination lens for the proximity sensor; and an ambient light sensor focusing portion that diffuses the incident light for the ambient light sensor, wherein the proximity sensor focusing portion is located at a center of the ambient light sensor focusing portion, and wherein the proximity sensor focusing portion corresponds to a bump established on the ambient light sensor focusing portion.

19. The combination lens of claim 18, wherein the proximity sensor focusing portion and the ambient light sensor focusing portion are integrally formed together from a common material.

20. The combination lens of claim 18, wherein the proximity sensor focusing portion comprises a radius that is different from the ambient light sensor focusing portion.

* * * * *